INVENTOR
NILS ANDERS LENNART WIKDAHL
BY Hane and Bayley
ATTORNEYS

United States Patent Office 3,513,971
Patented May 26, 1970

3,513,971
CONTINUOUS METHOD FOR DEGASIFYING AND CLEANING AQUEOUS SUSPENSIONS OF FIBROUS MATERIALS
Nils Anders Lennart Wikdahl, 42 Bravallavagen, Djursholm, Sweden
Filed Feb. 16, 1968, Ser. No. 706,084
Claims priority, application Sweden, Feb. 17, 1967, 2,270/67
Int. Cl. B03b 7/00
U.S. Cl. 209—3             4 Claims

ABSTRACT OF THE DISCLOSURE

There is disclosed a continuous method for degasifying and cleaning aqueous suspensions of fibrous materials by first removing the free air from a suspension by submitting the same to vacuum and then removing substantially all of the undesired small solid particles as may be present in the suspension by means of one or more hydrocyclone separator stages whereupon the suspension is dewatered.

THE INVENTION

Figure 1:
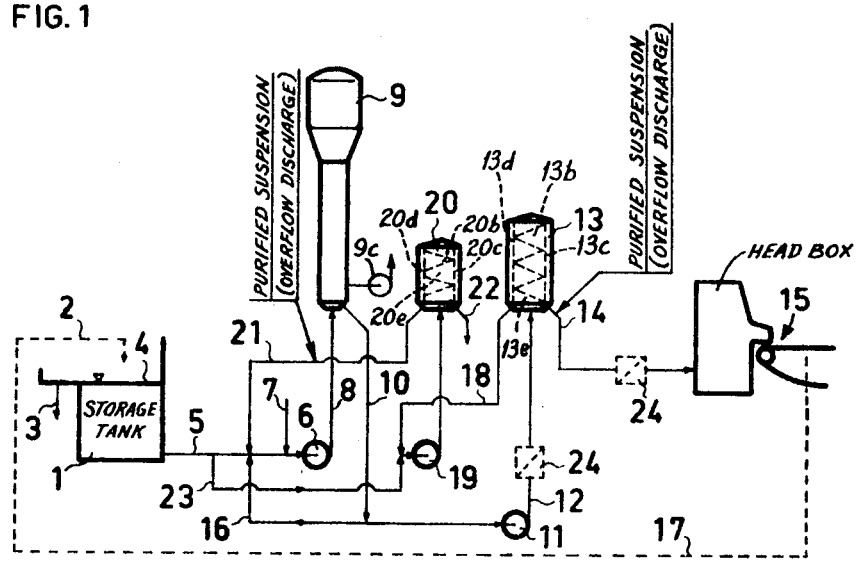

The present invention relates to a continuous method of removing gaseous and solid components from fiber suspensions, particularly from cellulosic fiber suspensions and the like.

The basic purpose of such method is, of course, to remove undesired constituents contained in the suspension even if it cannot always be entirely avoided also to remove at the same time a certain quantity, though it may be small, of desired constituents.

The invention relates particularly to a continuous method of removing from suspensions of the kind mentioned free gases present in the suspension, especially air. Free air is present in the suspension in the form of small bubbles which are occluded in the fibers and other particles, or are adsorbed to the surface of fibers and other particles. The suspensions may also contain a larger or smaller quantity of dissolved air. The usual content of free air in a suspension which has not been degasified, is about 0.5–1% of the total volume of liquid, but even a higher content of air is not unusual. In modern practice, even moderate quantities of air in the suspension are considered to cause considerable inconveniences in the dewatering of the suspension.

Different methods of removing air from fiber suspensions, either alone or in connection with other purifying operations, have been proposed and are also employed in practice. According to one of the known methods, air is removed from a fiber suspension by atomizing the suspension, while being subjected to vacuum, in a chamber in which at the prevailing temperature a pressure is maintained which is somewhat higher than the vapor pressure corresponding to the boiling point of the suspension. The purpose of such pressure control is to prevent boiling of the suspension. This method according to available reports has a surprisingly high degasifying efficiency and a high output can be obtained with a vacuum tank having a minimal volume.

Another known method effects purification of the suspension by means of a hydrocyclone-separation prior to a degasifying operation of the above-mentioned kind. According to this method, the outlet for the suspension leaving the hydrocyclone separator is connected to the vacuum tank in such a way that the rotational energy of the suspension flowing through the outlet is utilized to effect atomization of the suspension. The purpose of such arrangement is to save energy which is desirable especially in view of the fact that it is considered essential to carry the atomization so far that monomolecular layers of the suspension are obtained as this seems to be necessary to obtain a degasification of the entire suspension.

As is evident from the above, it is well known in the art that the removal of free air present in a fiber suspension is a vital prerequisite for carrying out a satisfactory operation.

It is a widely held opinion among experts in the art that the removal of air should take place after the hydrocyclonic separation so that air which may be added during such separation operation is also removed before the suspension is delivered, for instance, to the wet end of a paper machine or pulp machine for dewatering.

Such widely held opinion may be correct when the hydrocyclonic separation is carried out in such a way that the addition of air during that operation cannot be avoided, for instance in an open system. Then it is possible directly to maintain a strict check on the entire operation as was previously generally considered necessary and sound practice. Nowadays, however, this consideration is no longer of decisive importance. In spite of this and in spite of the undeniable and generally acknowledged practical disadvantages involved in carrying out the degasifying operation after the hydrocyclonic separation, this is practically the only method currently employed, though not to a great extent due to the many disadvantages inherent in this method.

The invention provides a novel and improved method with which degasifying can be safely carried out prior to the hydrocyclonic separation thus eliminating the disadvantages of the known methods, and which has further important advantages.

With the method of the invention, it is possible, for instance, by degasifying before the hydrocyclonic separation, to obtain the required separating efficiency at a reduced pressure drop across the cyclone separators which, in turn, results in reduced power consumption. Such highly favorable result of the separation is due partly to the fact that the considerable transport of air in radial direction in the separation chamber and the consequently increased transportation of solid impurities toward the center of the separator are eliminated by degasifying of the suspension before the separation thereof in the hydrocyclone separators.

It has further been found that by carrying out the separation in immediate connection with the degasifying, another surprising effect is obtained in that the free air in the suspension is removed more or less completely during the degasifying operation. At the same time, due to the instability in the system, air dissolved in the suspension is converted into free air which also, to a greater or smaller extent, is removed during the degasifying operation. It may thus happen that the volume of air that remains in the suspension as free air after the degasifying is, in fact, approximately as great as before the degasifying and that it is only the volume of dissolved air that has decreased. The effect of the degasifying of the suspension would thus seem to be rather poor. However, due to the above-mentioned instability with respect to the presence of air in the free state and in the dissolved state in the suspension and the subsequent cyclonic separation, a larger or smaller part of the free air remaining after the degasifying is redissolved and will remain dissolved in the suspension, partly due to the increase in pressure to which the suspension is exposed during the separation and partly and above all due to the large shearing stresses appearing in the cyclone separator. The suspension thus undergoes a further homogenization which is of great importance for the subsequent processing of the same.

Finally, de-aeration before the separation in hydrocyclones has the advantage that in the event the suspension in addition to the hydrocyclone separation, is subjected to a screening operation, such operation can also be performed with an increased efficiency.

Figure 2:
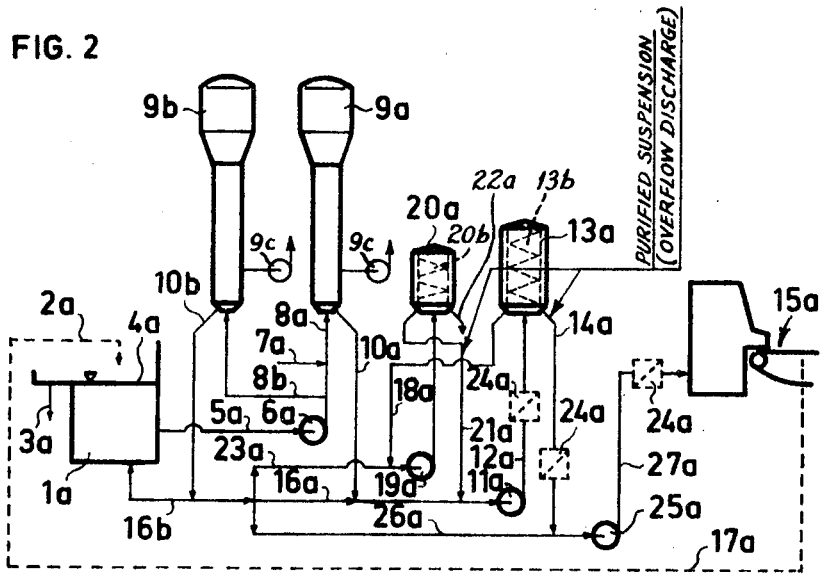

The invention is described more in detail with reference to the accompanying drawing in which:

FIGS. 1 and 2 show flow diagrams of two different embodiments of an installation for carrying out the method according to the invention.

In FIG. 1 the installation comprises a storage tank 1, such as a vat is supplied with fiber suspension through a feed inlet 2. A weir or overflow 3 maintains the liquid level 4 in the vat at least approximately constant. The suspension is discharged from vat 1 through a pipe 5 connected to a pump 6. As the fiber concentration in the discharge flow may be rather low, pipe 5 is connected to a pipe 7 through which additional fibers can be fed into pipe 5. The pressure side of pump 6 is connected by a pipe 8 to a conventional degasifying device 9 including a vacuum chamber in which a vacuum is maintained such that liquid entering the chamber is caused to boil whereby it is liberated from at least the major portion of gases occluded in the liquid. The vacuum is maintained in the chamber by conventional means indicated by a vacuum supply 9c connected by a pipe to device 9. The liquid is then fed through a pipe 10 at least in part to the suction side of a second pump 11 and from the pressure side of the pump through a pipe 12 to a purifying device 13. This device includes a hydrocyclone separator installation of conventional design, preferably a multi-cyclone separator installation, as is described for instance in Swedish Pat. 200,549. There are indicated in device 13 three separators 13b; the apex of each separator facing left. The apex discharges communicate with a chamber 13d and the vortex discharges with a chamber 13c. Suspension is fed to a central chamber 13e via pipe 12. The installation is kept completely filled during the separation and the suspension is maintained at a pressure such that air suction is prevented The purified or cleaned suspension is fed from a chamber 13c through a pipe 14 to a dewatering device 15 of conventional design, such as the head box feeding to a paper making machine.

Pipes 5 and 10 are interconnected by a bypass 16. Due to the constant liquid level 4 maintained in vat 1 a constant pressure is maintained at the connection point of the two pipes whereby a constant flow to the dewatering device 15 through pipe 14 is obtained. Any possible excess of suspension is returned from the degasifying device 9 to pipe 5 through pipe 16.

In the event the dewatering device 15 is constituted by the wet end of a paper machine or a pulp machine such constant flow is a prerequisite for carrying out the method of the invention by means of the illustrated system.

The suspension which is fed to vat 1 via feed inlet 2 may be as is indicated by a dotted line 17, so-called "white water" that is, water which has passed through the dewatering device 15 and hence contains a low concentration of fibers.

FIG. 1 further shows that the impurity component is fed from chamber 13d of the purifying device 13 via a pipe 18 and a pump 19 to a second hydrocyclone separation stage 20. There are indicated in stage two separators 20b; the apex of each separator facing right. The apex discharges communicate with a chamber 20c, the vortex discharges with a chamber 20d and suspension is fed into a central chamber 20e. This second stage supplies a further purified or cleaned component which through a pipe 21 is returned from chamber 20d to pipe 5. The impurity component removed from the suspension in stage 20 is discharged from chamber 20c through a pipe 22.

The second hydrocyclone separation stage also includes a bypass pipe 23 which connects the suction side of pump 19 to pipe 5.

FIG. 1 also shows by dashed lines two optional screening devices 24 which may be included either in pipe 12 or in pipe 14. Such screening devices may be conventional pressure screening devices, that is, screening devices which are so closed that air or other gases cannot become intermingled with suspension passing through the screening devices.

The installation according to FIG. 2 is distinguished from the one according to FIG. 1 in that the installation of FIG. 2 includes two degasifying devices 9a and 9b, and that adjustment of the fiber concentration is effected by a feed inlet 7a connected to pipe 8a leading to degasifying device 9a. A branch pipe 8b connects a point of pipe 8a located between feed inlet 7a and the pressure side of pump 6a to degasifying device 9b. Accordingly, suspension is fed directly from vat 1a to degasifying device 9b via pump 6a and pipes 8a and 8b.

The degasified suspension is fed from device 9a to the suction side of a pump 11a via a pipe 10a. This pipe is further connected by pipes 16a and 16b to vat 1a. Pipe 10b is connected by pipes 16a and 16b respectively to pipe 10a and also directly to vat 1a.

Pump 11a is so laid out that it will accept the total flow from the degasifying device 9a through pipe 10a and also the flow from the secondary hydrocyclone separation stage 20a through pipe 21a, and some of the flow through pipe 16a and then feed the combined flow to a first hydrocyclone separation stage 13a. Similarly, pump 19a is so laid out that its feed pipe 23a leading to the suction side of the pump receives via a pipe 18a the impurity component discharged or separated in the first hydrocyclone separation stage 13a and also receives via pipe 16b an additional flow of the suspension. The pressure side of pump 19a is connected to a second hydrocyclone separation stage 20a and the impurity component separated in this stage is discharged from the system through an outlet 22a.

Stages 13a and 20a are arranged and connected in the same manner as purifying devices 13 and 20 as indicated by separators 13b and 20b respectively and partition walls.

The purified or cleaned suspension discharged from the hydrocyclone separation stage 13a is fed through a pipe 14a to the suction side of a further pump 25a, which is so laid out that it is capable of accepting, in addition to the flow of the purified suspension, via pipe 26a, a certain volume of the suspension flowing through pipe 16b. Pump 25a feeds the entire flow accepted by it to a dewatering device 15a via a pipe 27a.

The feed inlet 2a for vat 1a which also coacts with an overflow or weir 3a may be arranged to receive the liquid separated in the dewatering device 15a, as is indicated by dashed line 17a.

As is also indicated by dashed lines, conventional pressure type screening devices 24a may be included in appropriate pipes of the system, as it is indicated for pipes 12a, 14a and 27a.

In the installations according to FIGS. 1 and 2, the pumps which should be visualized as conventional centrifugal pumps, are so arranged that the feed and inlet pipes thereof communicate with each other and also with the de-aeration device and the vat of the installation. Since, as previously described, the liquid level is maintained substantially constant in the vat, the pumps always work at a substantially constant inlet pressure as controlled by said liquid level. This has the advantage that a substantially constant flow through both the degasifying devices and the pumps may be maintained without requiring complex and expensive control means. Elimination of such control means also considerably reduces the servicing costs of the installation.

It has been found that such constant flow through the degasifying devices and the pumps can be maintained without special control means even though there is a free or exposed surface of the liquid in the vacuum chamber of the degasifying devices. To compensate for the presence of such exposed surface, outlets 10 and 10a, 10b, respectively, of the degasifying devices are arranged as so-called barometric legs. As is evident, the height of the free liquid surface in the vacuum chamber of the degasifying device is controlled by the absolute pressure existing above such surface in the gas-filled part of the degasifying vacuum chamber and the flow resistance in the outlet portion of the degasifying device, and in the pipes 10 and 10a, 10b, respectively, connected therewith. This flow resistance varies slightly with the flow of liquid through the degasifying device. The absolute pressure above the free surface of the liquid will continuously be somewhat lower than the pressure which at the prevailing temperature corresponds to the boiling point of the liquid. As previously described, degasifying of the liquid is effected by boiling the same under vacuum. The liquid level is continuously determined by the absolute pressure so that at an arbitrarily selected point below the free surface of the liquid there will be a constant static pressure which is a function of the absolute pressure in the gas space of the degasifying device and of the hydrostatic pressure exerted by the liquid column above the selected arbitrary point.

The installations shown in FIGS. 1 and 2 and described a connection therewith are merely intended to be illustrative of installations by means of which the method of the invention can be carried out in a convenient and effective manner. A degasifying device particularly suitable for carrying out the method of the invention is more fully described in U.S. patent application Ser. No. 677,940, filed Oct. 25, 1967.

I claim:

1. In a continuous method for removing gaseous and solid components from an aqueous fiber suspension the steps of:

pumping an aqueous fiber suspension to a degasifying device;

then degasifying said fiber suspension by boiling under vacuum conditions;

then pumping the degasified fiber suspension to a purifying device and removing therein undesired solid components from said fiber suspension by hydrocyclonic separation means under closed flow conditions to prevent the intermingling of the suspension with the air or other gases;

then feeding the degased and purified suspension while still maintaining closed flow conditions to prevent intermingling of the suspension with air or other gases to a dewatering device; and finally dewatering the suspension in said dewatering device.

2. The method of claim 1 in which feed inlets of pumping means for carrying out said pumping operations are interconnected by a by-pass pipe to establish communication therebetween and continuously connected by a pipe to a common storage tank for the suspension.

3. The method of claim 2 in which the aqueous fiber solution is pumped to the degasifying device from the storage tank and a substantially constant liquid level is maintained in said tank.

4. The method of claim 1 wherein the separation means are maintained completely filled with suspension during operation and the suspension is maintained at a pressure such that intermingling of air with the suspension is substantially prevented.

References Cited

UNITED STATES PATENTS

| | | | |
|---|---|---|---|
| 2,685,937 | 8/1954 | Clark et al. | 55—55 XR |
| 2,931,503 | 4/1960 | Clark | 209—211 |
| 3,007,542 | 11/1961 | Giampapa | 55—191 XR |
| 3,019,901 | 2/1962 | Woodruff | 209—211 |
| 3,206,917 | 9/1965 | Kaiser | 55—41 |
| 3,237,763 | 3/1966 | Wikdahl | 209—211 XR |

FRANK W. LUTTER, Primary Examiner

U.S. Cl. X.R.
209—211; 210—188, 512